US012530717B2

(12) United States Patent
Rule et al.

(10) Patent No.: US 12,530,717 B2
(45) Date of Patent: *Jan. 20, 2026

(54) SYSTEM AND METHOD FOR FACILITATING BANK ACCOUNT INFORMATION CHANGES

(71) Applicant: Capital One Services, LLC, McLean, VA (US)

(72) Inventors: Jeffrey Rule, Chevy Chase, MD (US); Michelle Olenoski, Washington, DC (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/789,858

(22) Filed: Jul. 31, 2024

(65) Prior Publication Data
US 2024/0386488 A1 Nov. 21, 2024

Related U.S. Application Data

(63) Continuation of application No. 18/124,911, filed on Mar. 22, 2023, now Pat. No. 12,079,864, which is a
(Continued)

(51) Int. Cl.
G06K 15/00 (2006.01)
G06F 16/23 (2019.01)
(Continued)

(52) U.S. Cl.
CPC ......... *G06Q 40/02* (2013.01); *G06F 16/2379* (2019.01); *G06N 5/04* (2013.01);
(Continued)

(58) Field of Classification Search
CPC ... G06Q 20/00–425; G06Q 40/00–128; G06Q 2220/00–18; G05F 21/00–88; H04L 63/00–308
(Continued)

(56) References Cited

U.S. PATENT DOCUMENTS 5,892,900 A 4/1999 Ginter et al.
5,963,925 A 10/1999 Kolling et al.
(Continued)

FOREIGN PATENT DOCUMENTS

WO 2006/009879 1/2006

OTHER PUBLICATIONS

"Frequently Asked Questions," Internet Citation, Jan. 1, 2006 (Jan. 1, 2006), XP002998656, Retrieved from the internet: URL:http://wwwnationalcity.com/personal/onlineservices/SwitchBanks/Faq.asp [retrieved on Jan. 1, 2006].
(Continued)

Primary Examiner — Daniel St Cyr
(74) Attorney, Agent, or Firm — HUNTON ANDREWS KURTH LLP

(57) ABSTRACT

In a method for changing a user's bank account information in merchant account databases a server receives a login request including a user identification and first user authentication information. The server further receives a request to change bank account information from a first bank account to a second bank account for merchant accounts of the user and network login information for the first bank account. The server accesses an account information database for the first bank account and downloads transaction information for merchant transactions involving the first bank account. The server identifies a set of merchant user accounts involved in the merchant transactions and receives account login information for a data site associated with a selected
(Continued)

account. The server accesses the data site and changes a bank account identification stored therein from the first bank account to the second bank account.

17 Claims, 4 Drawing Sheets

Related U.S. Application Data continuation of application No. 16/906,400, filed on Jun. 19, 2020, now Pat. No. 12,045,872.

(51) Int. Cl.
| | |
|---|---|
| *G06N 5/04* | (2023.01) |
| *G06N 20/00* | (2019.01) |
| *G06Q 10/0631* | (2023.01) |
| *G06Q 20/34* | (2012.01) |
| *G06Q 20/40* | (2012.01) |
| *G06Q 40/02* | (2023.01) |
| *H04L 9/40* | (2022.01) |
| *H04L 67/06* | (2022.01) |
| *H04L 67/306* | (2022.01) |
| *H04L 67/54* | (2022.01) |
| *G06F 3/0481* | (2022.01) |

(52) U.S. Cl.
CPC ....... *G06N 20/00* (2019.01); *G06Q 10/06316* (2013.01); *G06Q 20/352* (2013.01); *G06Q 20/409* (2013.01); *H04L 63/083* (2013.01); *H04L 67/06* (2013.01); *H04L 67/306* (2013.01); *H04L 67/54* (2022.05); *G06F 3/0481* (2013.01); *G06Q 2220/00* (2013.01); *H04L 2463/082* (2013.01)

(58) Field of Classification Search
USPC ...................................................... 705/7.26
See application file for complete search history.

(56) References Cited

U.S. PATENT DOCUMENTS

| | | | |
|---|---|---|---|
| 6,173,272 B1 | 1/2001 | Thomas et al. | |
| 7,003,493 B2 | 2/2006 | Weichert et al. | |
| 8,380,597 B2 | 2/2013 | Night et al. | |
| 8,417,636 B2 | 4/2013 | Love et al. | |
| 9,842,367 B2 * | 12/2017 | Johnston | G06Q 20/023 |
| 9,911,114 B2 | 3/2018 | Rackley, III et al. | |
| 11,188,907 B1 | 11/2021 | Vijayvergia et al. | |
| 12,045,872 B2 * | 7/2024 | Rule | G06N 5/04 |
| 12,079,864 B2 * | 9/2024 | Rule | H04L 63/083 |
| 2002/0069148 A1 | 6/2002 | Mutschler et al. | |
| 2003/0105688 A1 | 6/2003 | Brown et al. | |
| 2003/0158811 A1 | 8/2003 | Sanders et al. | |
| 2003/0233317 A1 | 12/2003 | Judd | |
| 2003/0236726 A1 | 12/2003 | Almonte et al. | |
| 2004/0088258 A1 | 5/2004 | McCoy et al. | |
| 2004/0128240 A1 | 7/2004 | Yusin | |
| 2004/0215565 A1 | 10/2004 | Huffman | |
| 2006/0112011 A1 | 5/2006 | Al-Ali | |
| 2007/0061270 A1 | 3/2007 | Seto et al. | |
| 2009/0076951 A1 | 3/2009 | Szamel | |
| 2010/0250406 A1 | 9/2010 | Clark et al. | |
| 2011/0313920 A1 | 12/2011 | Trickel | |
| 2012/0030115 A1 | 2/2012 | Peace et al. | |
| 2012/0215694 A1 | 8/2012 | Vilmos | |
| 2013/0006861 A1 | 1/2013 | McCoy et al. | |
| 2013/0254054 A1 | 9/2013 | Diehl | |
| 2014/0195420 A1 | 7/2014 | Trickel | |
| 2015/0127527 A1 | 5/2015 | Eide | |
| 2015/0186844 A1 | 7/2015 | Trickel | |
| 2015/0193886 A1 | 7/2015 | Trickel | |
| 2015/0213409 A1 | 7/2015 | Trickel | |
| 2016/0005113 A1 | 1/2016 | Mendez et al. | |
| 2016/0253639 A1 | 9/2016 | Sharma | |
| 2016/0342967 A1 | 11/2016 | Proctor et al. | |
| 2017/0178124 A1 | 6/2017 | Havilio | |
| 2021/0065229 A1 | 3/2021 | Singhi et al. | |
| 2021/0103917 A1 | 4/2021 | Mullen et al. | |

OTHER PUBLICATIONS

International Search Report and the Written Opinion of the International Searching Authority issued in related PCT Application No. PCT/US2021/037546 mailed Oct. 6, 2021.

* cited by examiner

SYSTEM AND METHOD FOR FACILITATING BANK ACCOUNT INFORMATION CHANGES

CROSS-REFERENCE TO RELATED APPLICATION

The subject application is a continuation of U.S. patent application Ser. No. 18/124,911 filed Mar. 22, 2023, which is a continuation of U.S. patent application Ser. No. 16/906,400 filed Jun. 19, 2020, the complete disclosure of which is incorporated herein by reference.

FIELD OF THE INVENTION

This disclosure relates generally to systems and methods for processing account transactions, and more specifically, to an automated system and method for changing financial account information in multiple merchant account information databases.

BACKGROUND OF THE INVENTION

Financial account holders carry out account transactions involving many individual merchant accounts. In many cases, payments and other transactions between merchants and account holders are facilitated through the use of bank (other financial institution) account information held in a database by the merchant. This simplifies on-line transactions for account holders by making it so they need not enter bank account information (e.g., account and routing numbers) every time they conduct a transaction. The down side to this convenience is that when an account holder wishes to replace his primary financial account from one bank to another, there may be a large number of merchant or other consumer accounts for which the account holder would need to change his bank account information. Because of the large number of merchant accounts that may be involved (some of which the account holder may not even recall) and the associated hassle of changing bank account information for each, many account holders may be reluctant to change financial accounts from one bank to another. This is often referred to as account lock-in.

SUMMARY OF THE INVENTION

An illustrative aspect of the invention provides an automated method of changing a user's bank account information in merchant account databases. The method comprises receiving, by a remote server from a user device over a network, a login request including a user identification and first user authentication information. The method further comprises receiving, by the remote server from the user device, a request to change bank account information from a first bank account to a second bank account for merchant accounts of the user and receiving, by the remote server from the user device, network login information for the first bank account. The remote server accesses an account information database for the first bank account using the network login information and downloads from the account information database, transaction information for each of a plurality of merchant transactions involving the first bank account. The remote server then identifies, using the transaction information, a set of user accounts with merchants involved in the plurality of merchant transactions. The method further comprises transmitting, by the remote server to the user device over the network, a request for login information associated with a selected account from the set of user accounts and receiving, by the remote server from the user device, account login information for a data site associated with the selected account. The remote server accesses, using the account login information, the data site associated with the selected account and changes a bank account identification stored at the data site from a first identifier associated with the first bank account to a second identifier associated with the second bank account.

Another aspect of the invention provides an automated system for assisting a user in changing bank account information in merchant account databases. The system comprises a user interface device and a banking application server. The user interface device comprises a user device data processor, a user interface including a user input arrangement and a display, a communication interface selectively connectable to a network for communication thereover, and a user device memory accessible by the user device data processor. The user device memory has stored thereon a banking application comprising instructions to the user device data processor to transmit, to a remote server via the communication interface and the network, a login request including a user identification and user authentication information and a request to change bank account information from a first bank account to a second bank account for merchant accounts of the user. The banking application comprises further instructions to conduct interactive communication with the remote server during which user account information is requested and received from the user via the user interface and transmitted to the remote server. The banking application server is in selective communication with the user interface device via the network and is configured to receive the login request from the user interface device via the network and to authenticate the login request using the user identification and user authentication information. The banking application server is further configured to receive, from the user interface device, the request to change bank account information and establish an interactive communication session with the user interface device. During the interactive communication session, the banking application server receives, from the user interface device, bank account access information for the first bank account and accesses a bank account information database for the first bank account using the bank account access information. The banking application server then downloads, from the bank account information database, transaction information for a plurality of merchant transactions involving the first bank account and identifies, using the transaction information, a set of merchant accounts for which a plurality of transactions have been conducted involving the first bank account. The banking application then receives, from the user interface device, merchant account access information for each merchant account in the set of merchant accounts, accesses, for each merchant account using the merchant account access information, a merchant account information database, and replaces, in each merchant account information database, a first identifier associated with the first bank account with a second identifier associated with the second bank account.

Another aspect of the invention provides a banking application server for assisting a user in changing bank account information in merchant account databases from a first bank account to a second bank account. The system comprises a communication interface in communication with one or more networks and an automated data processing system having a user authentication data processor, a bank account access data processor, and a merchant account access data processor. The user authentication data processor is configured to receive, from a user device via a first network, a bank account change request. The request includes a user identification associated with the second bank account and first authentication information. The user authentication data processor is further configured to verify that the first authentication information is associated with the user identification. The user authentication data processor is still further configured to receive, from the user device via the first network, second authentication information, and to verify that the second authentication information was generated by a transaction card associated with the second banking account. The bank account access data processor is configured to receive, from the user device via the first network, account information for the first bank account. The account information includes a first account identifier and network login information. The bank account access data processor is further configured to access, via a second network, which may be the same as the first network, an account information database for the first bank account using the network login information, to download transaction information for a plurality of merchant transactions from the account information database, and to select a set of merchant user accounts involved in the plurality of merchant transactions. The merchant account access data processor is configured to, for each merchant user account in the set of merchants receive, from the user device, merchant account access information, and access, via a third network, which may be the same as the first or second network, using the merchant account access information, a merchant account information database in which the first account identifier is stored. The merchant account access data processor is further configured to replace, in the merchant account information database, the first account identifier with a second account identifier associated with the second bank account.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides automated methods by which a bank account holder wishing to transfer his financial account from one bank to another may change his or her bank account information in one or more merchant account information databases. An account holder may conduct an interactive session with a banking application server that reviews the account holder's past transaction history to identify particular merchant accounts then steps the account holder through the process of changing the bank account information held in association with each of the merchant accounts. In an exemplary scenario, a user having a bank account with a first bank has opened a new bank account at a second bank and wishes to use the second account to make payments for products and services and on monthly bills for, for example, utilities, rent, wireless services, etc. The methods and systems of the present invention provide for automated review and analysis of the transactions on the old bank account, identification of the various accounts to which payments were made from the old account, and initiation of an interactive process to change the bank account information held in association with each of these accounts.

Figure 1:
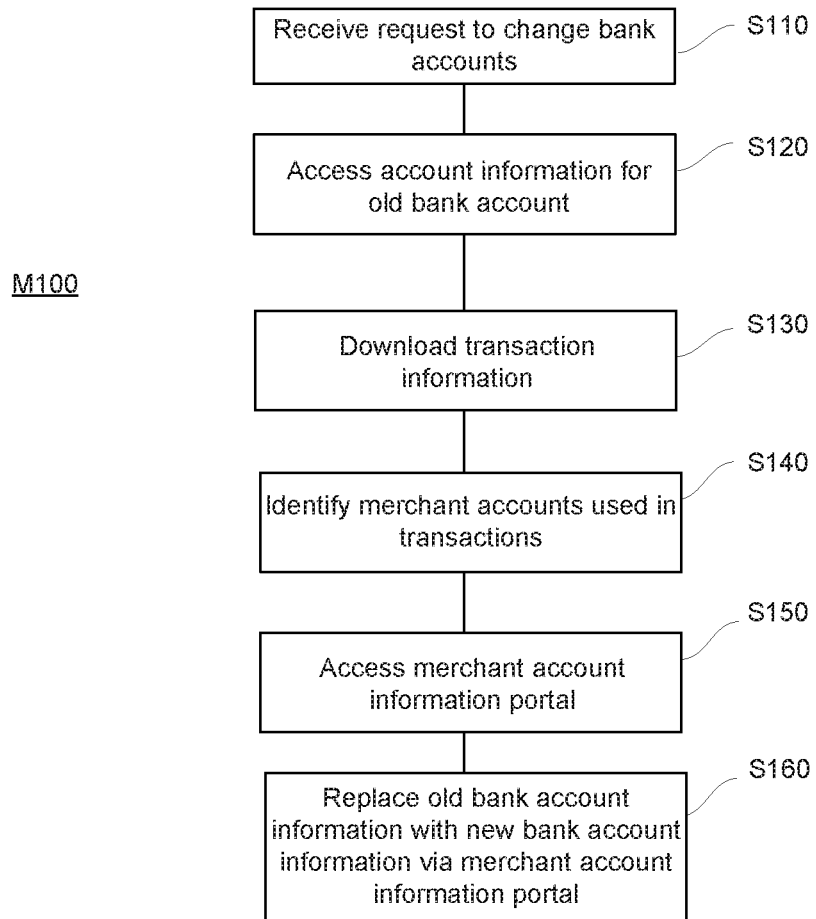
FIG. 1 is a flow chart of actions in a method of method of changing a user's bank account information in merchant account databases according to an embodiment of the invention.

FIG. 1 illustrates an exemplary method M100 of changing a user's bank account information in merchant account databases according to an embodiment of the invention. In this method M100, the user is an account holder who wishes to change the financial account that the account holder uses for routine payments and other transactions conducted with any of a variety of merchants. More specifically, the account holder wishes to change the account he uses from a first bank account (typically associated with a first bank or other financial institution) and a second bank account (typically, but not necessarily associated with a second bank or other financial institution). The actions of the method may be carried out by a banking application server, which may be associated with the administrator or holder of the second bank account.

As used herein, a "merchant" is any entity with which an account holder carries out a transaction. This may include without limitation any retailer, wholesaler, or bartering entity. A merchant may have one or more physical locations or may be an online retailer.

At S110 of the method M100, a request to change bank account information from the first bank account to the second bank account is received by the remote banking application server from a user device. In some embodiments, this request may be received as part of an interactive session between the user device and the banking application server. In establishing this session or, in some cases, after receiving a standalone request, the banking application server may request and, receive from the user device, user and/or user device authentication information that the server may use to verify that the user and/or user device are associated with the second bank account and are authorized to make the change request. In some embodiments, the authentication information may be or include a user name and password combination submitted as part of a login procedure. In some embodiments, the authentication information may be provided in response to a prompt transmitted to the user device by the banking application server. In some embodiments, the banking application server may be configured to require multi-factor authentication information. This may require, in some cases, that the user device provide authentication information that includes information encrypted using previously assigned device- or user-specific encryption keys. In some such embodiments, the authentication information may be or include information encrypted using an encryption key specific to a transaction card associated with the second account.

The request to change bank account information may include identification information for the first bank account. This may include identification of the banking institution, the type of account, and/or a unique account identifier. The request may also include identification of certain merchant accounts for which the account holder wishes to have bank account information changed or criteria for selecting or prioritizing merchant accounts for which bank account information is to be changed.

At S120, the banking application server accesses account information for the first bank account. In some embodiments, this may include requesting and receiving, from account holder via the user device, access authorization information that can be used to access account information for the account holder's first bank account. In some embodiments, this may include login information that can be used to log onto an Internet web page or other network portal associated with the first bank and configured for providing account holders access to their account information. Upon receiving the access information, the banking application server navigates to and logs onto the account information portal as the account holder. In other embodiments, the banking application server may carry out the information access action S120 as part of an interactive session with the account holder via the user device. In such embodiments, the banking application server may navigate to the account information portal of the first bank and then prompt the account holder to enter the access authorization information.

Upon successful access to the first bank account information portal, the banking information server downloads first account transaction information at S130. This may include navigating through menus or web pages of the first bank account information portal to submit one or more transaction information requests. In some embodiments, the banking information server may use previously obtained knowledge of the architecture of the information portal to facilitate navigation and selection of available options for viewing and downloading information. The banking information server may download information on all transactions available through the information portal or may download information for a subset of such transactions. In some cases, the information portal may provide only on-screen display of transaction information. Accordingly, the banking information server may, in some embodiments, be configured to apply screen scraping techniques to download the information.

The downloaded transaction information would include, for each transaction, an identification of a merchant or other party involved in the transaction. It may also include additional transaction characteristics such as a merchant account identifier, transaction type (e.g., purchase, payment, transfer, etc.), a monetary amount involved in the transaction, time and date information, and merchandise or service type or identification. In particular embodiments, the server may limit the transactions for which information is downloaded to those having predetermined characteristics. This could include, for example, transactions occurring within the previous twelve months or transactions of a particular type (e.g., purchases or payments on account). In some embodiments, the banking information server may download transaction information for a representative sample of debit and credit transactions for a time period leading up to the current date. In other embodiments, the banking information server may download an initial group of transactions meeting specified download characteristics and then pare these to a representative subset for further processing.

At S140, the banking information server identifies one or more merchant accounts that were involved in multiple first bank account transactions. In some cases, merchant account information may be determined directly from the transaction information for each transaction. In other cases, the server may identify a merchant from the transaction information and request account information for that merchant from the account holder. In some embodiments, the server may identify a set of merchant accounts that are most often identified as being involved in first bank account transactions.

In some embodiments, the banking information server may analyze the available information for some or all of the first bank account transactions to identify recurring debits and credits. The server may use these transactions to identify associated merchant accounts or, in some cases, may present transaction information to the account holder for assistance in identifying an associated merchant account.

In particular embodiments, the server may use machine learning to establish a set of merchant accounts. Machine learning models may be informed, not only by the downloaded transaction information, but by data from usage databases. In some cases, the machine learning model may be used to identify the accounts expected to be most relevant to the account holder. In other cases, the model may identify an intersection of most-often-used merchant accounts with those that are most likely to have a merchant account database in which bank account information for the account holder is stored.

In various embodiments, the banking information server may use predetermined criteria and/or machine learning to prioritize the merchant accounts in the set of merchant accounts. In an exemplary embodiment, the merchant accounts could be prioritized based on the relative number of transactions associated with each. In another exemplary embodiment, the merchant accounts could be prioritized based in part on their relative likelihood of having a merchant account database in which bank account information for the account holder is stored.

At S150, the banking information server accesses a merchant account information portal associated with a particular merchant account. In typical embodiments, this may be accomplished by navigating to a merchant account management website or other network portal for the entity managing the merchant account. In some embodiments, this may include requesting and receiving, from the account holder via the user device, access authorization information that can be used to access merchant account information for the particular merchant account. Such access information may include, for example, login information that can be used to log onto the merchant account management portal. Upon receiving the access information, the banking application server may navigate to and log onto the merchant account management portal as the account holder. It will be understood that, absent additional direction from the account holder to the contrary, the login information is not retained or shared by the banking application server after completion of the account information change. In other embodiments, the banking application server may carry out the merchant account information access action S150 as part of an interactive session with the account holder via the user device. In such embodiments, the banking application server may navigate to the merchant account management portal and then prompt the account holder to enter the access authorization information.

Upon successful access to the merchant account management portal, the banking information server, at S160, submits information via the merchant account management portal to change the financial account information held by the merchant system from information for the first bank account to information for the second bank account. In both cases, the information may include bank account identification information. In some embodiments, the identification information may be or include an identifier such as an actual account number. The action of replacing the old bank account information with new bank account information may, accordingly, include replacing a first identifier associated with the first bank account with a second identifier associated with the second bank account.

In some embodiments, rather than an actual account number, the identification information for the second bank account may be or include a token representing the account number or other account-specific identifier. In such embodiments, the banking information server may create and store an association between a token and an identifier for the second bank account. The token may then be used for transactions involving the merchant account and authorized users of the second bank account. The effect of tokenizing the account number is to provide additional security for the account holder, particularly when the token is unique to the merchant account. Merchant-specific tokens cannot be used by other merchants or by any user to gain direct access to the second bank account.

The action of replacing the old bank account information may include actions associated with navigating through menus or screens of the merchant account information portal to reach a location where financial account information is displayed and/or edited. In some embodiments, the banking information server may use previously obtained knowledge of the architecture of the merchant information portal to facilitate navigation and selection of available options for viewing and downloading information. The server may then enter/upload the appropriate replacement information to the merchant account information portal, which saves the information in a merchant account information database for use in future transactions.

The actions of accessing a merchant account information portal (S150) and replacing old bank account information with new bank account information via the account information portal (S160) may be repeated for each merchant account in the set of merchant accounts. The banking application server may proceed through these repetitions in an order based on the previously established prioritization. The method M100 may also include, prior to the action S150, the action of transmitting to the user device for display to the account holder, an indication of the next merchant account for which the banking application server will replace the existing bank account information and a prompt for the user to confirm that the change is to be made. Upon receiving positive confirmation from the user device, the banking application server would carry out the access action at S160.

In some cases, the merchant account information portal may require documentation to verify authorization to make a change from one bank account to another. Accordingly, in some embodiments of the invention the banking application server may be configured to determine whether hard copy documentation is required, identify the document required, and obtain and transmit or upload a copy of the document to the merchant account information portal or associated merchant account administrator. The server may obtain the document from a document database or from the account holder.

Figure 2:
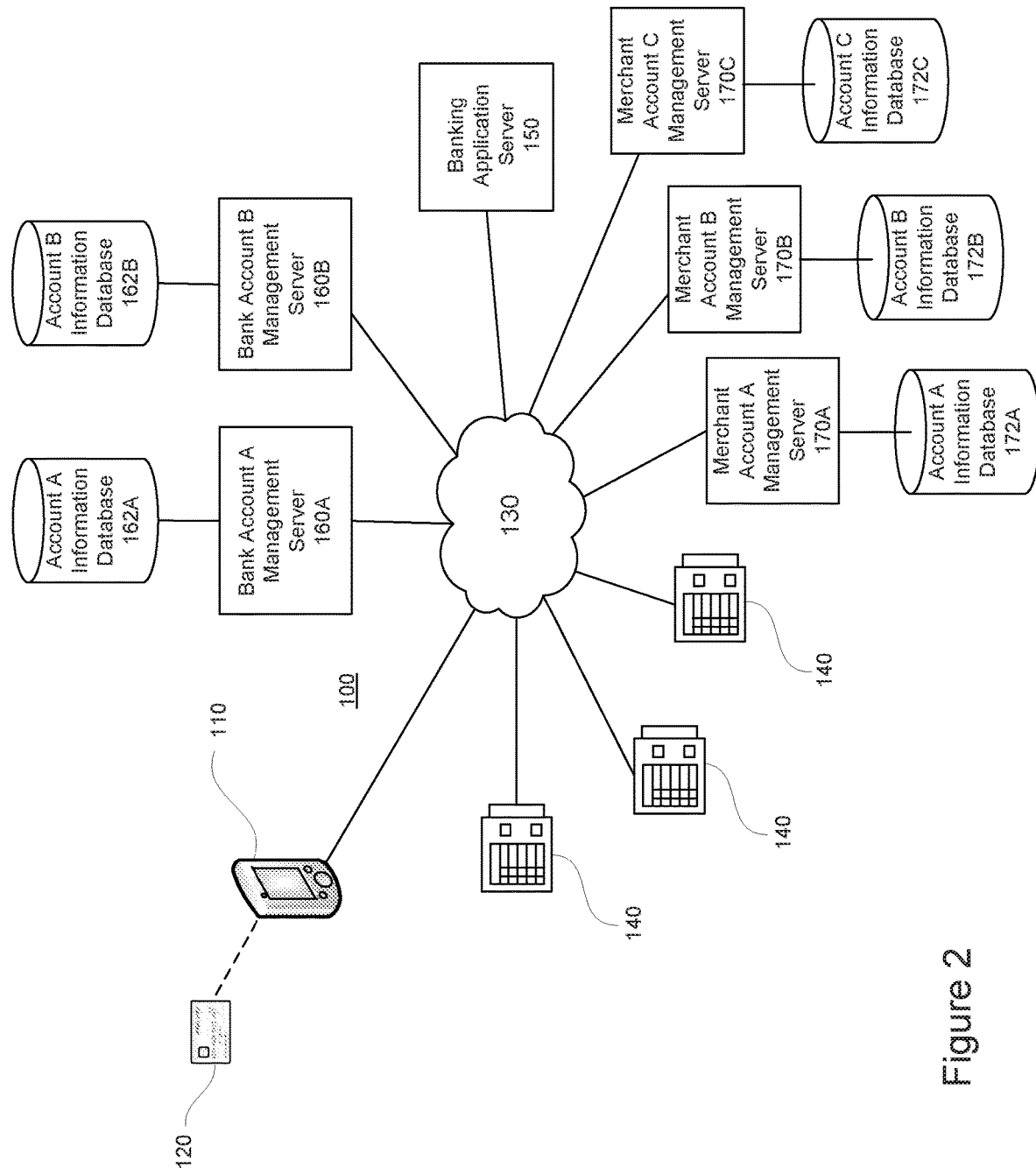
FIG. 2 is a schematic representation of a system for changing a user's bank account information in merchant account databases according to an embodiment of the invention.

With reference now to FIG. 2, an automated system 100 for assisting a user in changing bank account information in merchant account databases according to an illustrative embodiment of the invention includes one or more user devices 110, a banking application server 150, and a communication network 130. The system may also include or, alternatively, may be in communication with, one or more merchant transaction processing devices 140, one or more bank account management servers 160, and one or more merchant account management systems 170.

As referred to herein, a network-enabled computer system and/or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the transactions contemplated in the embodiments may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 2 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 2.

The network 130 may be any form of communication network capable of enabling communication between the transaction entities and the card processing system 100. For example, the network 130 may be one or more of a wireless network, a wired network or any combination of wireless network and wired network. The network 130 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 130 may utilize one or more protocols of one or more network elements to which it is communicatively coupled. The network 130 may translate to or from other protocols to one or more protocols of network devices. Although the network 130 is depicted as a single network, it will be appreciated that it may comprise a plurality of interconnected networks, such as, for example, the Internet, a service provider's network, a cable television network, corporate networks, and home networks.

In the example embodiments presented herein, an account holder may be any individual or entity having a transaction account with a financial institution and/or a merchant. An account holder user device 110 may be a mobile device or other processor that an account holder uses to carry out a transaction. An account may be held by any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. In some instances, the account holder may be a transaction processing entity such as a financial institution, credit card provider, or other entity that offers accounts to customers. An account may or may not have an associated card, such as, for example, a credit card for a credit account or a debit card for a debit account. The account card may be associated or affiliated with a merchant or one or more social networking sites, such as a co-branded credit card.

The account holder user interface device 110 may be any computer device or communications device including a server, a network appliance, a personal computer (PC), a workstation, and a mobile interface device such as a smart phone, smart pad, handheld PC, or personal digital assistant (PDA). In a particular embodiment illustrated in FIG. 3, the user device 110 includes an on-board data processor 111 in communication with a memory module 113, a user interface 114, a communication interface 112, and an NFC interface 116. The user device 110 may optionally include an image capturing device 115 (e.g., a digital camera). The data processor 111 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 114 of the device 110 includes a user input mechanism, which can be any device for entering information and instructions into the user device 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 112 is configured to establish and support wired or wireless data communication capability for connecting the device 110 to the network 130 or other communication network. The communication interface 112 can also be configured to support communication with a short-range wireless communication interface, such as near field communication, radio-frequency identification, and Bluetooth.

The NFC interface 116 is configured for establishing near field communication with an NFC transmitter and/or receiver. This may include, in particular, the NFC communication interface of a data processing chip 121 of a smart transaction card 120.

In embodiments of the invention, the memory 113 may have stored therein one or more applications usable by the data processor 111 to conduct and/or monitor transactions between the user device 110 and the merchant transaction processing devices 140 or other transaction processing systems over the network 130. These applications may include instructions usable by the data processor 111 to identify transaction events, store event data in the memory 113, and communicate event data to a transaction information processing system and/or one of the bank account management servers 160.

In particular embodiments, the memory 113 may include an account change application having instructions for facilitating a change from a first bank account associated with a first financial institution to a second bank account associated with a second financial institution. In typical embodiments, the account change application may be associated with the second bank account and may be a part of a suite of applications for carrying out transactions involving the second bank account. These account change application instructions may be configured for receiving, from the account holder via the user interface 114, login information for establishing authenticatable communication with the banking application server 150. The login information may include an account identifier or other user identification and user authentication information. The user authentication information may include, a password or a scanned biometric characteristic. In some embodiments, the user authentication information may be or include information encrypted using an encryption key associated with the second bank account and the account holder or the user device 110. Alternatively or in addition, the user authentication information may include card verification information obtained from a smart card 120 associated with the second bank account. In certain embodiments, the card verification information may be or include information encrypted using a unique encryption key stored in the card data processing chip 121.

The account change application instructions may be configured to transmit a login request to the banking application server 150 via the network 130. This request would include the user identification and user authentication information. The instructions may be further configured to establish an interactive communication session between the user device 110 and the banking application server 150. The application may be configured to receive change instructions from the account holder via the user interface 114 and to construct and transmit to the banking application server 150, a request to change bank account information from the first bank account to the second bank account in databases 172 associated with merchant accounts of the account holder. The change request may include identification information for the first bank account and/or identification of certain merchant accounts for which the account holder wishes to have bank account information changed. It may, alternatively or in addition, include criteria for selecting or prioritizing merchant accounts for which bank account information is to be changed.

The account change application instructions may be configured to, as part of a previously established interactive communication session or in a newly established interactive communication session, receive instructions, from the banking application server 150 via the communication interface 112 and the network 30, to prompt the account holder to enter login information for use in establishing communication with a bank account management server 160A associated with the first bank account. In some embodiments, the login information may be received from the account holder and transmitted by the user device 110 to the banking application server 150. In certain embodiments, the account change application may be configured to temporarily establish control of interactive communications between the user device 110 and the bank account management server 160A. Such communications may, in particular, require the account holder to enter login and/or other authentication information to permit access to a transaction information database 162A via the bank account management server 160A.

The account change application instructions may further be configured to, as part of a previously established interactive communication session or in a newly established interactive communication session, receive instructions, from the banking application server 150 via the communication interface 112 and the network 30, to prompt the account holder to enter user account information. The application then instructs the data processor 111 to receive such user account information from the account holder via the user interface 114 and to transmit the user account information to the banking application server 150 via the communication interface 112 and the network 30. The user account information requested by the banking application server 150 may be information associated with one or more merchant accounts. In some embodiments, the application may be further configured for receiving confirmation requests in relation to merchant accounts for which bank account information is to be changed. In certain embodiments, the account change application may also be configured to temporarily establish control of interactive communications between the user device 110 and one or more merchant account management servers 170. Such communications may, in particular, require the account holder to enter login and/or other authentication information to permit access to information from a merchant account information database 172 associated with a particular account management server 170.

The bank account management servers 160A, 160B are each network-enabled data processing systems associated with a financial institution and for management and control of information relating to a plurality of bank accounts. The first bank account is one of the plurality of bank accounts associated with the first management server 160A, and the second bank account is one of the plurality of bank accounts associated with the second management server 160B. The first bank account management server 160A is in communication with a first bank account information database 162A having stored therein information on transactions involving the first bank account. The second bank account management server 160B is in communication with a second bank account information database 162B having stored therein information on transactions involving the second bank account. Each of the bank account management servers 160A, 160B may be configured for communication with a plurality of user devices 110 via the network 130 for establishing interactive communication sessions with account holders. The bank account management servers 160A, 160B may also be configured for communication with other entities via the network including the banking application server 150. The account management servers 160A, 160B may be further configured for verifying account holder identification information (e.g., login information) and/or user device authorization for obtaining account information. Upon verification of authorization, the management servers 160A, 160B may receive and evaluate requests for account information, retrieve requested information from the account information databases 162A, 162B, and transmit the information to the requesting user device for display and/or download.

The merchant account management servers 170A, 170B, 170C are network-enabled data processing systems each associated with a merchant and configured for management and control of merchant transactions for a plurality of merchant user accounts. Each merchant account management server 170 may be configured for communication with a plurality of user devices 110 via the network 130 for establishing interactive communication sessions with merchant account holders. The merchant account management servers 170 may also be configured for communication with other entities via the network including the banking application server 150. The servers 170 may be configured, in particular, to receive account holder information from a user device 110 via an on-line interactive session over the network 130. Such account holder information may include contact information (mailing address, email address, phone numbers, etc.) and user preferences. It may also include information for making payments on the account holder's merchant account. Such information may include, in particular, bank account or other financial account identification. The servers 170 may be configured to receive such account holder information and store it in the associated merchant account information databases 172.

The merchant account management servers 170 may be further configured for, prior to receiving or transmitting merchant account information to a user device 110, verifying merchant account holder identification information (e.g., login information) and/or user device authorization for entering or receiving account information.

A merchant transaction processing device 140 may be any network enabled processor configured for processing a transaction involving the transaction card 120 or, in some embodiments, the use device 110. A merchant may have one or more physical locations or may be an online retailer. The merchant transaction processing device 140 may be any network enabled device (e.g., cash register or other POS terminal or an on-line transaction server) that is capable of communicating with the transaction card 140 (e.g., by NFC communication) or otherwise receiving transaction card information for carrying out a transaction and is capable of communicating with a transaction processor (not shown) via the network 130.

Figure 3:
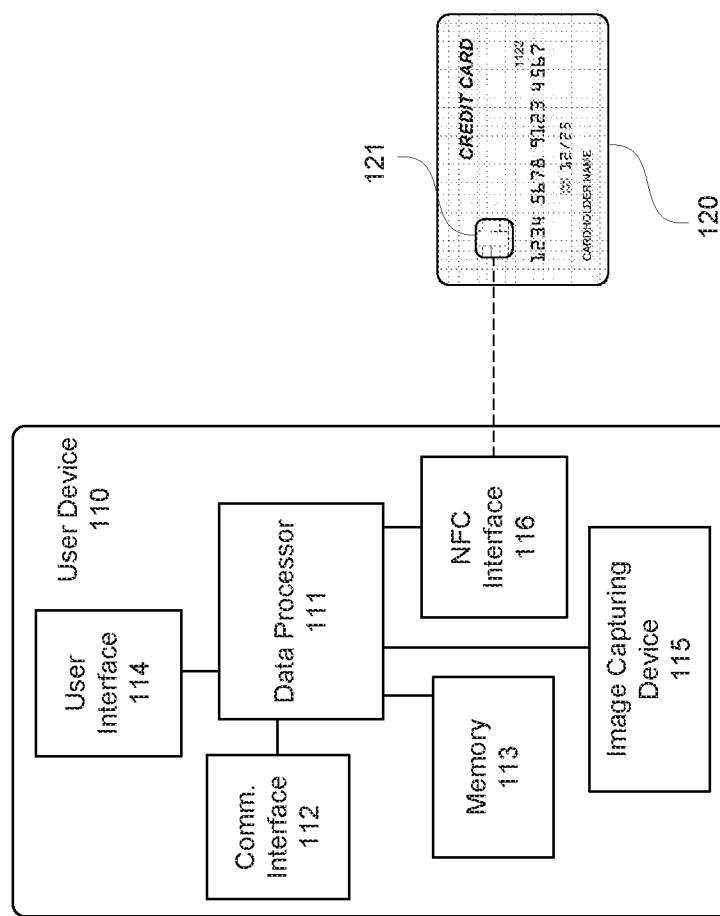
FIG. 3 is a schematic representation of a user device and a transferable transaction card usable in embodiments of the invention.
Figure 4:
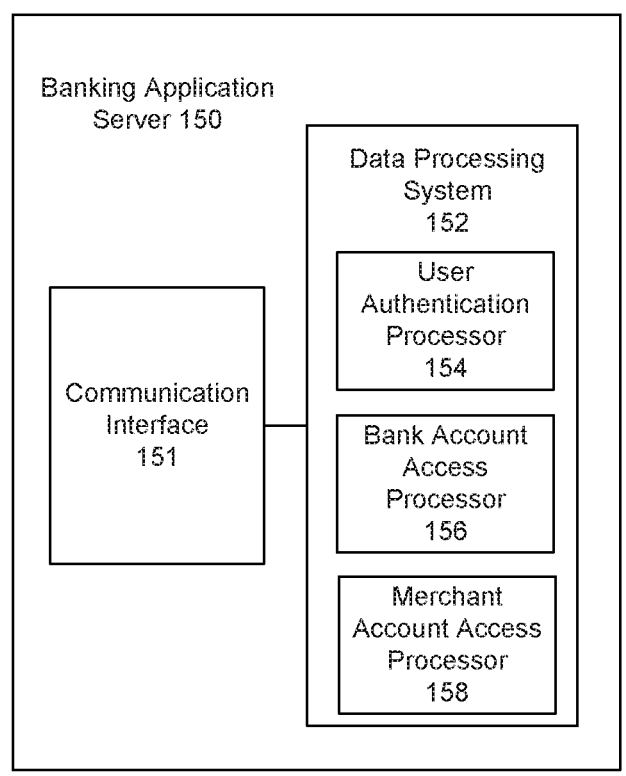
FIG. 4 is a schematic representation of banking application server according to an embodiment of the invention.

The banking application server 150 is a system of one or more network-enabled processing servers configured to receive and process bank account holder requests to change bank account information from the first bank account to the second bank account. In typical embodiments, the banking application server 150 is associated with the financial institution associated with the second bank account. With reference to FIG. 4, the banking application server 150 may include a communication interface 151 configured for establishing communication with one or more networks including the network 130, and, via the one or more networks, the user device 110, a plurality of bank account management servers 160 (which may include the first and second bank account management servers 160A, 160B), a plurality of merchant account servers 170 (which may include the first, second and third merchant account management servers 170A, 170B, 170C), and, in some embodiments, the merchant devices 140. It will be understood that while three merchant account management servers are shown in FIG. 3, there may be any number of such servers.

The banking application server 150 comprises a server data processing system 152 comprising a user authentication processor 154, a bank account access processor 156, and a merchant account access processor 158. The banking application server 150 may be configured to establish interactive communication with the user device 110 upon receiving a request initiated via the account change application resident thereon. The user authentication processor 154 may be configured to receive a login request from the user interface device 110 via the communication interface 151 and the network 130 and to authenticate the login request using user identification and user authentication information included therein. The user authentication processor 154 may be configured, in particular, to use the user identification and user authentication information to verify that the user and/or user device are associated with the second bank account and are authorized to make a change request. In some embodiments, the authentication information may be or include a user name and password combination submitted as part of the login procedure. In some embodiments, the authentication information may be provided in response to a prompt transmitted to the user device 110 by the banking application server 150.

The user authentication processor 154 may be configured to receive multi-factor authentication information from the user device 110. Such information may include account holder biometric characteristic information or information encrypted using previously assigned device- or user-specific encryption keys. In some such embodiments, the authentication information may be or include information encrypted using an encryption key specific to a transaction card 120 associated with the second account. The user authentication processor 154 may be further configured for decrypting (if applicable) the authentication information and comparing it to previously obtained authentication information associated with the second bank account to authenticate the login request and or the presence of a valid transaction card 120 associated with the second bank account.

The banking application server 150 may be configured to, after completion of the login procedure and authentication, receive a request to change bank account information from the user interface device 110. The bank account access processor 156 may be configured to receive as part of the request or in response to a transmitted prompt to the user, bank account access information for the first bank account. In response to receiving such information, the bank account access processor 156 may establish communication with the first bank account management server 160A via the communication interface 151 and the network 130 or another network. The bank account access processor 156 may then provide access information to the first bank account management server 160A directly (e.g., using login information received from the user device 110) or may facilitate communication between the user device 110 and the first bank account management server 160A for the user device 110 to transmit access information to the account management server 160A. In some embodiments, the communication between the bank account access processor 156 and the first bank account management server 160A may take the form of an interactive communication session.

The bank account access processor 156 is further configured to, upon establishing communication with the account management server 160A, access transaction information stored in the first bank account information database 162A. This may require that the banking application server 150 be configured to recognize pages, menus, and prompts presented by the bank account management server 160A as part of the interactive information session and to provide the selections and responses necessary to navigate to a site location where transaction information from the information database 162A may be accessed. In some embodiments, the bank account access processor 156 may use previously obtained knowledge of the architecture of the bank account management server's information portal to facilitate navigation and selection of available options for viewing and downloading transaction information. The bank account access processor 156 may be further configured to determine the transactions for which information is available and download information for some or all of such transactions. In some embodiments, the bank account access processor 156 may be configured to download information for a subset of transactions having a particular characteristics. In some cases, the information portal may provide only on-screen display of transaction information. Accordingly, the bank account access processor 156 may, in some embodiments, be configured to apply screen scraping techniques to download the information.

The bank account access processor 156 may be configured to identify, using the transaction information, a set of one or more merchant accounts for which a plurality of transactions have been conducted involving the first bank account. The bank account access processor 154 may be configured to use predetermined criteria to reduce the number of merchant accounts in the account set and/or to establish a prioritized order for the accounts in the set. In an exemplary scenario, these could include first, second, and third merchant accounts respectively associated with the first, second, and third merchant account management servers 170A, 170B, 170C shown in FIG. 2. In some embodiments, the bank account access processor 154 may be configured may be configured to apply pattern recognition criteria to the transactions as part of the action to prioritize the merchant user accounts.

The merchant account access processor 158 may be configured to access a merchant account information portal at each of the merchant account management servers 170A, 170B, 170C. In some embodiments, this may include receiving from the user device 110 merchant account access information for each merchant account and transmitting such information to each respective merchant account management 170A, 170B, 170C. In other embodiments, the merchant account access processor 158 may establish interactive communication between the user device 110 and each of the merchant account management servers 170A, 170B, 170C for the purpose of entering the merchant account access information. In such embodiments, the access information may not be accessible to the banking application server 150.

The merchant account access processor 158 may be configured to, upon successful access to the merchant account management portal, submit information to the merchant account management server 170A, 170B, 170C to change the financial account information held in the respective merchant account information database 172A, 172B, 172C from information for the first bank account to information for the second bank account. The action of replacing the first bank account information may include actions associated with navigating through the menus or screens of the merchant account information portal to reach a location where financial account information can be entered or edited. In some embodiments, the merchant account access processor 158 may use previously obtained knowledge of the architecture of the merchant information portal to facilitate navigation and selection of available options for viewing and downloading information. The merchant account access processor 158 may then enter/upload the appropriate replacement information to the merchant account management server 170A, 170B, 170C, which saves the information in the respective merchant account information database 172A, 172B, 172C.

The merchant account access processor 158 may be configured to repeat the actions necessary to change bank account information for each merchant account in the set of merchant accounts. The merchant account access processor 158 may proceed through these repetitions in an order based on a previously established prioritization of the accounts in the set. The merchant account access processor 158 may be configured to transmit to the user device 110 an indication of the next merchant account for which information is to be changed and a prompt for the account holder to confirm that the change is to be made. Upon receiving positive confirmation from the user device, the merchant account access processor 158 would carry out the merchant account access actions.

The methods and systems of the present invention provide a significant improvement in speed and security by providing an automated approach to changing financial account information associated with a potentially large number of merchant accounts. This, in turn, may significantly reduce the account lock-in effect by removing for account holders a perceived obstacle to changing from one bank to another.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An automated method of changing a user's bank account information in merchant account databases, the method comprising:
   receiving, via a first network, a request to change account information at an unidentified set of merchants from a first user bank account to a second user bank account;
   receiving, via the first network, login information for the first user bank account;
   accessing, via a second network, an account information database for the first user bank account using the login information for the first user bank account;
   downloading, via the second network, a complete transaction data set for the user from the account information database;
   parsing, by a bank account access data processor, the complete transaction dataset to identify a plurality of merchant user accounts for the unidentified set of merchants, the plurality of merchant user accounts identified based on their relative number of appearances in the complete transaction dataset;
   accessing, by a merchant account access processor, an account portal for each of the identified plurality of merchant accounts to replace bank account information for the first bank to the bank account information for the second bank;
   receiving from a user device, by a merchant account access data processor, merchant account access information for a merchant user account associated with each of the identified plurality of merchant accounts;
   accessing, via a third network, which may be the same as the first or second network, using the merchant account access information, a merchant account information database in which a first account identifier is stored; and
   replacing, by the merchant account access data processor, in the merchant account information database, the first account identifier with a second account identifier associated with the second bank account.

2. A method according to claim 1 wherein the actions of accessing the merchant account information database in which the first account identifier is stored and replacing the first account identifier with the second account identifier associated with the second bank account are carried out as a series of interactive steps between the bank account access data processor and the merchant account access data processor and wherein a display of each interactive step is transmitted to the user device.

3. A method according to claim 1 further comprising:
   receiving via the first network, authentication information for the second user bank account, wherein the second authentication information includes an encrypted verification block encrypted by a transaction card associated with the second user bank account, and
   authenticating the second user bank account comprising decrypting the encrypted verification block.

4. A method according to claim 1 wherein the bank account access data processor is configured to:
   prioritize the merchant user accounts to determine a processing order; and
   carry out the actions to receive, access, and replace for the merchant user accounts in a sequence according to the processing order.

5. A method according to claim 1 wherein the bank account access data processor is configured to apply pattern recognition criteria to a plurality of transactions as part of the action to prioritize the merchant user accounts.

6. A method according to claim 1 wherein the bank account access data processor is configured to apply a machine learning model to select a set of merchant user accounts involved in a plurality of merchant transactions based on the download transaction information as well as data from a usage database.

7. An automated system, comprising:
   a remote banking application server configured to:
      receive, from a user device via a first network, a request to change account information at an unidentified set of merchants from a first user bank account to a second user bank account; and
      receive, via the first network, login information for the first user bank account;
   a bank account access data processor configured to:
      access, via a second network, an account information database for the first user bank account using the login information for the first user bank account;
      download, via the second network, a complete transaction data set for the user from the account information database;
      parse the complete transaction dataset to identify a plurality of merchant user accounts for the unidentified set of merchants, the plurality of merchant user accounts identified based on their relative number of appearances in the complete transaction dataset;
      access, by a merchant account access processor, an account portal for each of the identified plurality of merchant accounts to replace bank account information for the first bank to the bank account information for the second bank;

receive from a user device, by a merchant account access data processor, merchant account access information for a merchant user account associated with each of the identified plurality of merchant accounts;

access, via a third network, which may be the same as the first or second network, using the merchant account access information, a merchant account information database in which a first account identifier is stored; and replace, by the merchant account access data processor, in the merchant account information database, the first account identifier with a second account identifier associated with the second bank account.

8. A system according to claim 7 wherein the actions of accessing the merchant account information database in which the first account identifier is stored and replacing the first account identifier with the second account identifier associated with the second bank account are carried out as a series of interactive steps between the bank account access data processor and the merchant account access data processor and wherein a display of each interactive step is transmitted to the user device.

9. A system according to claim 7 further comprising:
receiving via the first network, authentication information for the second user bank account, wherein the second authentication information includes an encrypted verification block encrypted by a transaction card associated with the second user bank account, and
authenticating the second user bank account comprising decrypting the encrypted verification block.

10. A system according to claim 7 wherein the bank account access data processor is configured to:
prioritize the merchant user accounts to determine a processing order; and
carry out the actions to receive, access, and replace for the merchant user accounts in a sequence according to the processing order.

11. A system according to claim 7 wherein the bank account access data processor is configured to apply pattern recognition criteria to a plurality of transactions as part of the action to prioritize the merchant user accounts.

12. A system according to claim 7 wherein the bank account access data processor is configured to apply a machine learning model to select a set of merchant user accounts involved in a plurality of merchant transactions based on the download transaction information as well as data from a usage database.

13. A computer-readable non-transitory medium comprising computer-executable instructions for changing a user's bank account information in merchant account databases that, when executed by at least one processor, perform procedures comprising the steps of:
receiving, via a first network, a request to change account information at an unidentified set of merchants from a first user bank account to a second user bank account;
receiving, via the first network, login information for the first user bank account;
accessing, via a second network, an account information database for the first user bank account using the login information for the first user bank account;
downloading, via the second network, a complete transaction data set for the user from the account information database;
parsing, by a bank account access data processor, the complete transaction dataset to identify a plurality of merchant user accounts for the unidentified set of merchants, the plurality of merchant user accounts identified based on their relative number of appearances in the complete transaction dataset;
accessing, by a merchant account access processor, an account portal for each of the identified plurality of merchant accounts to replace bank account information for the first bank to the bank account information for the second bank;
receiving from a user device, by a merchant account access data processor, merchant account access information for a merchant user account associated with each of the identified plurality of merchant accounts;
accessing, via a third network, which may be the same as the first or second network, using the merchant account access information, a merchant account information database in which a first account identifier is stored; and
replacing, by the merchant account access data processor, in the merchant account information database, the first account identifier with a second account identifier associated with the second bank account.

14. A computer-readable non-transitory medium according to claim 13 wherein the actions of accessing the merchant account information database in which the first account identifier is stored and replacing the first account identifier with the second account identifier associated with the second bank account are carried out as a series of interactive steps between the bank account access data processor and the merchant account access data processor and wherein a display of each interactive step is transmitted to the user device.

15. A computer-readable non-transitory medium according to claim 13 further comprising:
receiving via the first network, authentication information for the second user bank account, wherein the second authentication information includes an encrypted verification block encrypted by a transaction card associated with the second user bank account, and
authenticating the second user bank account comprising decrypting the encrypted verification block.

16. A computer-readable non-transitory medium according to claim 13 wherein the bank account access data processor is configured to:
prioritize the merchant user accounts to determine a processing order; and
carry out the actions to receive, access, and replace for the merchant user accounts in a sequence according to the processing order.

17. A computer-readable non-transitory medium according to claim 13 wherein the bank account access data processor is configured to apply a machine learning model to select a set of merchant user accounts involved in a plurality of merchant transactions based on the download transaction information as well as data from a usage database.

* * * * *